H. JONES.
BRAKE SHOE.
APPLICATION FILED JAN. 23, 1915.

1,144,601.

Patented June 29, 1915.

WITNESSES

INVENTOR
Harry Jones.
BY
ATTORNEY

UNITED STATES PATENT OFFICE.

HARRY JONES, OF SUFFERN, NEW YORK, ASSIGNOR TO AMERICAN BRAKE SHOE & FOUNDRY COMPANY, OF MAHWAH, NEW JERSEY, A CORPORATION OF NEW JERSEY.

BRAKE-SHOE.

1,144,601.   Specification of Letters Patent.   Patented June 29, 1915.

Application filed January 23, 1915. Serial No. 3,874.

*To all whom it may concern:*

Be it known that I, HARRY JONES, a citizen of the United States, and a resident of Suffern, in the county of Rockland and State of New York, have made and invented certain new and useful Improvements in Brake-Shoes, of which the following is a specification.

This invention relates to brake shoes, and more particularly to that class wherein a lubricant is provided in the body of the shoe for the prevention of the chattering and squeaking thereof and promoting its noiseless operation.

The present invention has in view the provision of a brake shoe with an insert which is not injured by contact with molten metal during the casting of the shoe, and of such texture or porous nature that it will absorb an oil or other binder, and to unite therewith to such extent as to form an extremely efficient and practical lubricant for a brake shoe, without materially reducing or interfering with the proper braking effects thereof.

Other objects and advantages will appear as the description proceeds, wherein it is to be understood that changes in the precise embodiment of the invention can be made within the scope of what is claimed without departing from the spirit of the invention.

The preferred embodiment of my invention is disclosed in the accompanying drawings, wherein:—

Figure 1:
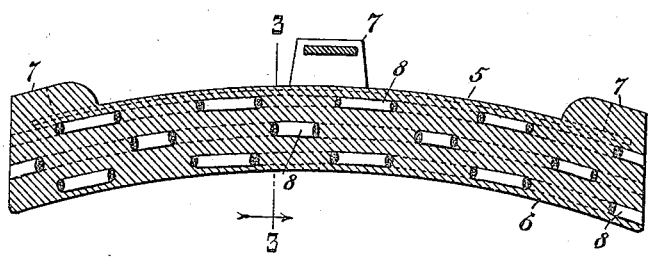
Figure 2:
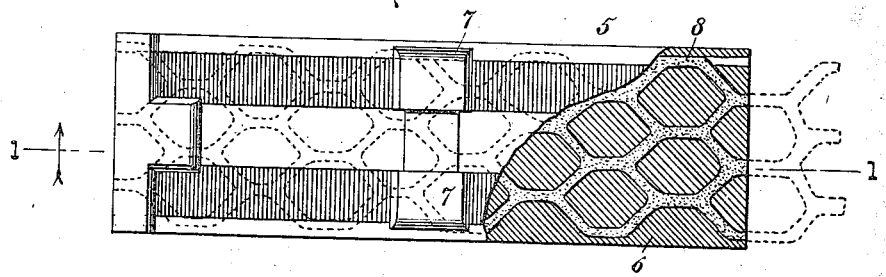
Figure 3:
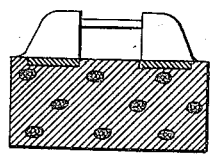
Figure 4:
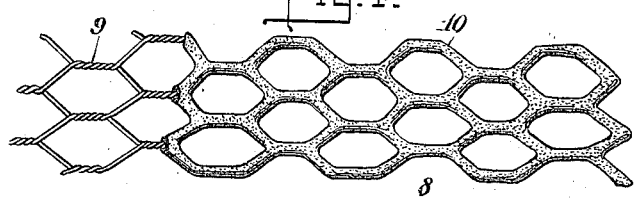

Figure 1 is a view, in central longitudinal section, of a brake shoe embodying the characteristic features of my invention; Fig. 2 is a top plan view of the foregoing, with parts thereof broken away, disclosing the lubricating inserts embedded within the cast metal; Fig. 3 is a cross-sectional view taken on the line 3—3 of Fig. 1; Fig. 4 is a view in plan of the insert with a portion of the lubricating material removed from one end of the wire mesh support.

Referring specifically to the several figures, wherein similar reference numerals designate corresponding parts throughout, a brake shoe 5 is formed with the cast metal body 6 and suitable lug 7 whereby it may be removably secured to a brake head, although it is to be understood that the cast metal body may be formed as a part of the brake head, if it should be so desired.

Arranged within the cast metal body 6 are a plurality of inserts 8 preferably arranged in parallel layers, one of which is illustrated in detail in Fig. 4.

Each insert is formed of a netting of wire, or expanded metal, or similar open-work or reticulated metal 9, which forms a support for a lubricating coating 10. This coating is preferably formed of graphite and sodium silicate, the latter being more commonly known as "water glass," mixed in approximately equal parts, by volume. The coating is formed upon the wire netting by repeatedly dipping the same into the mixture, as above constituted, and allowing each successive dipping to dry. After the coating has been thus built up to the requisite thickness, it is subjected to a heat approximating 1,200° F. whereby a porous coating is formed upon the insert capable of lubricating, to a limited extent, a brake shoe in which it is subsequently embedded. The insert is then placed, along with other similar ones if desired, in a mold, and the metal of the brake shoe body 5 is cast therearound. The coating, having been previously subjected to a high heat is not affected by that of the molten metal. The insert is formed somewhat longer than the body of the shoe, so as to project beyond the ends thereof, as illustrated in dotted lines in Fig. 2.

The sodium silicate forms a cement holding the particles of graphite together, but it is not sufficient in itself, to prevent the graphite from flaking away as the brake shoe contacts with the car wheel, and in order to overcome this, the shoe and insert is placed on end with the insert extending within a vessel containing a suitable oil, such as China wood or linseed, which, due to the peculiar texture or porous nature of the insert, is immediately absorbed thereby and enters into combination therewith, so as to provide or form a binder, preventing the flaking away of the graphite and forming a brake shoe practically noiseless in operation and possessing efficient braking properties.

As a matter of fact, not only does the lubricating compound not interfere with the braking properties or qualities of the shoe, but actually enhances the same. It will be understood that in the manufacture of brake shoes, the harder the iron employed, the more lasting the shoe is in service. These lasting qualities are imparted to the shoe by constructing it of what is generally termed "white" or "hard" iron, that is, a metal wherein there is little or no graphitic or free carbon, the carbon being all, or for the most part, combined with the metal. In the shoe constructed as above described, the graphite is added to the shoe while in service, that is, added to the wearing surface thereof, and lends to the shoe the lubricant which the shoe would naturally have when made of the softer metal or gray iron, and in which instance the shoe is possessed of greater frictional qualities, due to the free or graphitic carbon, the result being that while by my invention it is possible to use a white or hard iron to secure the lasting qualities of the shoe, yet the latter has imparted thereto the frictional qualities of a gray iron, due to the graphite added thereto in its free state.

What I claim is:—

1. A brake shoe comprising a body, and an insert therein having a lubricating coating thereon.

2. A brake shoe comprising a cast metal body with a reticulated metal insert embedded therein, said insert having a lubricating coating thereon.

3. A brake shoe comprising a metal body, a wire netting therein, and a lubricating coating carried by said netting, said netting extending substantially parallel to the wearing face of said shoe.

4. A brake shoe comprising a metal body, an insert embedded therein, said insert including a porous lubricating coating adapted to absorb a binder subsequent to the casting of the metal body of the shoe therearound.

5. An insert for brake shoes comprising an open-work support and a lubricating, heat-resisting coating thereon, said coating being adapted to absorb an oil binder.

6. An insert for brake shoes formed of reticulated metal, a graphite coating thereon, an ingredient incorporated with said graphite adapted to hold the same together and to said insert, said coating being of a porous texture and adapted to absorb oil subsequent to its insertion within a brake shoe.

7. An insert for brake shoes formed of reticulated metal, a coating thereon including sodium silicate and graphite.

8. An insert for brake shoes formed of reticulated metal, a coating thereon comprising a porous composition of sodium silicate and graphite, the same adapted to subsequently absorb oil, and to thereby render the coating plastic and prevent the flaking away of said graphite.

9. A brake shoe comprising a metal body, a plurality of connected tubes of porous graphite extending throughout the body of the shoe and adapted to absorb an oil binder therein.

10. An anti-chattering brake shoe comprising in part an insert of reticulated metal, said insert having a coating of graphite thereon, said coating also containing an ingredient to hold the particles of graphite together, and whereby the same is rendered sufficiently porous to absorb a binding agent.

11. A brake shoe having embedded therein an insert, said insert having a coating thereon consisting in part of graphite and oil.

12. A brake shoe having embedded therein a plurality of layers of reticulated metal, each of said layers being enveloped in a graphitic coating whereby to prevent the squeaking of the shoe when brought into frictional contact with the tread of a wheel.

13. A brake shoe having embedded therein a plurality of superposed reticulated metal inserts, each of said inserts being coated with a lubricating compound.

Signed at New York borough of Manhattan in the county of New York and State of New York this 12th day of January, A. D. 1915.

HARRY JONES.

Witnesses:
 MARY B. JUSTICE,
 ANNA V. WALSH.